Aug. 16, 1938.  P. KLAMP  2,126,893
METHOD OF MAKING ROLLER BEARING MEMBERS AND ROLLED BLANKS THEREFOR
Original Filed June 2, 1934
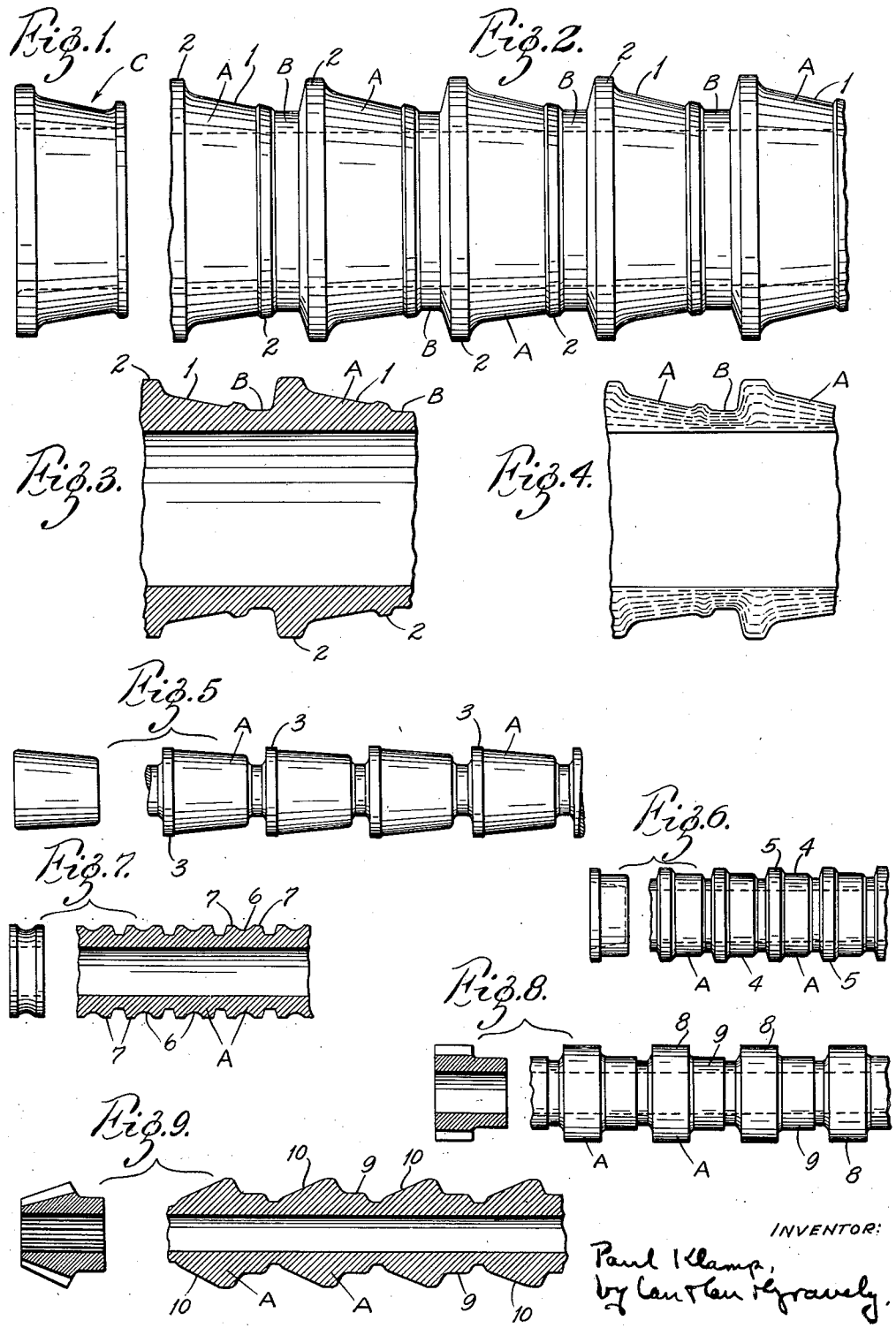

Patented Aug. 16, 1938

2,126,893

UNITED STATES PATENT OFFICE 2,126,893

METHOD OF MAKING ROLLER BEARING MEMBERS AND ROLLED BLANKS THEREFOR

Paul Klamp, Canton, Ohio, assignor to The Timken Roller Bearing Company, Canton, Ohio, a corporation of Ohio Original application June 2, 1934, Serial No. 728,690. Patent No. 2,060,087, dated November 10, 1936. Divided and this application January 28, 1935, Serial No. 3,719

7 Claims. (Cl. 29—148.4)

My invention relates to metal blanks that are intended to be made into profiled articles which are of circular section throughout their length. The invention consists principally in an article produced by working a rod or tube in a rolling mill in such manner that it becomes a continuous integral chain of like profiled blanks spaced apart but integrally connected by necks of smaller diameter than the individual blanks whereby said profiled rod or tube may be used as work stock in a screw machine and the end-most blank thereof may be machined before being cut off, and the next blank may then be advanced under control of a rib or shoulder of the profiled rod or tube into proper position to be machined by said screw machine. It also consists in the individual profiled blanks and in the article hereinafter more fully described and claimed. It also consists in the method hereinafter set forth and claimed.

In the accompanying drawing, which forms part of this specification and wherein like numerals refer to like parts wherever they occur, Fig. 1 is a side view of a typical cone or inner raceway member of a taper roller bearing, Fig. 2 is a side view of a portion of a series or chain of integrally connected blanks suitable for manufacture into roller bearing cones of the design illustrated in Fig. 1, Fig. 3 is a longitudinal sectional view of a portion of Fig. 2, Fig. 4 is a similar view diagrammatically illustrating the arrangement of the metal fibers in the blank of Fig. 3, Fig. 5 illustrates an ordinary type of roller for taper roller bearings and an integral chain of rolled blanks suitable for manufacture thereof, Fig. 6 illustrates a roller bearing cup and a chain of rolled blanks suitable for manufacture thereof, Fig. 7 illustrates the inner bearing member of a ball bearing, together with a chain of blanks suitable for the manufacture thereof, Fig. 8 illustrates a spur pinion gear, together with a chain of blanks suitable for the manufacture thereof; and Fig. 9 represents a bevel pinion gear, together with a chain of blanks suitable for the manufacture thereof.

The articles illustrated in the drawing are rolling mill products produced by rolling an elongated rod or tube by a method fully set forth and claimed in my copending application Serial No. 728,690 filed June 2, 1934, issued as Patent No. 2,060,087 on November 10, 1936, of which the present application is a division. Such rolling does not materially affect the length of the tube or rod or the internal diameter of the tube but produces such variations in its wall thickness as are required to conform to the profile of the work roll and the article that is to be produced from the blank. At all points in the length of the work, however, both the inner and outer peripheries thereof are circular.

The process of rolling effects plastic flow of the metal conformably to the profile of the work rolls of the mill but the metal is displaced mainly in axial planes without any substantial twisting thereof. Consequently, the metal fibers which, in the original tube, lay substantially parallel with the axis of the tube will, in the profiled blank, remain substantially in the same axial planes and the outer fibers will be approximately parallel to the surface of the profiled blank, as illustrated diagrammatically in Fig. 4.

The chain of blanks illustrated in Fig. 2 is rolled from a tube and comprises a series of individual blanks A spaced apart but integrally connected by necks B of smaller diameter than the individual blanks. It is contemplated that this chain of blanks will be treated as a unit and supplied as such to an automatic lathe or screw machine, the lathe tool or tools operating on the endmost blank and, when their work is completed, cutting away the neck portion to sever the completed work C from the chain. Accordingly, the neck portion is thick and strong enough to afford adequate support for the endmost blank during the working thereon. The neck is also long enough to give room for the working tool to do its work properly on the inner end of the blank and also to give room for the cutter to remove the neck and present the forward end of the next blank in proper position for the work tools. Reference is hereby made to my Patent No. 2,020,320 granted November 12, 1935, for a combined work feeding and holding device specially designed for use with my profiled tube or bar hereinbefore described. As more fully described in said patent, the work holder constitutes a releasable chuck of the collet type which utilizes the ribs of the work stock or bar to control the advance thereof for successive machining operations on the end of the bar.

In the article shown in Fig. 2, the individual blank comprises a relatively wide conical portion 1 intended for the raceway with a rib 2 at each end thereof, each blank being substantially identical with all of the other blanks of the same series or chain.

The article illustrated in Fig. 5 is produced from a solid rod by the method set forth and claimed in my said copending application. In other respects, the chain of blanks A illustrated in Fig. 5, as well as those shown in Figs. 6, 7, 8 and 9, are similar to the chain illustrated in Fig. 2; that is, they all comprise individual profiled blanks A spaced apart but integrally connected by necks that give them adequate support and position with them respect to the next following blank in such manner that the work on the endmost blank can be completed before it is severed from the chain. The individual blank of Fig. 5 approximates the size and shape of a taper roller bearing roller except that its large end is provided with a cylindrical band or rib 3. This band is intended for cooperation with the collet or other work holder in which the chain is held and is removed by the work tools from each endmost blank in succession leaving a continuous conical bearing surface.

The design of blank illustrated in Fig. 6 is intended for a cup or outer raceway member for a taper roller bearing, the inner cylindrical surface being cut away to conical form while the chain is mounted in a suitable work holder. In this design the outer surface 4 of the blank is substantially cylindrical with a rib 5 at one end thereof.

The design of blank illustrated in Fig. 7 is intended for the inner raceway member of a plain ball bearing. In this case the blank comprises an annular concave raceway portion 6 with rib portions 7 at each end thereof.

The designs illustrated in Figs. 8 and 9 are intended for the production of pinions or gears, Fig. 8 being intended for a spur gear and accordingly having its tooth portion 8 made in the form of a wide cylindrical rib of greater diameter than the shank portion 9, while the design of Fig. 9 is intended for a bevel gear and accordingly has its tooth portion 10 of conical form. In both of these cases, however, the chain is supplied as a unit to the screw machine and each gear is turned on the endmost blank before said blank is severed from the chain.

Various designs of blanks shown in the drawing are merely illustrative of the invention, as it is obvious that the invention is equally applicable to other profiled articles of circular section. Aside from the great economy and facility with which the blanks hereinbefore described can be rolled from tubes and rods, said blanks have the great merit that their outer fibers are compacted and are substantially parallel to the outer surfaces of the blanks. Consequently, bearing raceway members and other articles produced therefrom are very durable and of superior quality.

What I claim is:

1. A rolled article of manufacture consisting of a profiled blank of circular section, said article having a continuous bore extending axially therethrough and having its outer fibers disposed longitudinally and substantially parallel with the outer surface.

2. A rolled article of manufacture consisting of a series of like blanks and necks spacing them apart but integrally connecting them in the form of an elongated rod of size and length suitable for workstock in an automatic screw machine and said necks being strong enough to support the endmost blank while undergoing the work of such machine, each blank being approximately of the size and shape of a roller bearing roller with a raised cylindrical band at the larger end thereof.

3. A rolled article of manufacture consisting of a series of like blanks and necks spacing them apart but integrally connecting same in the form of an elongated rod of size and length suitable for workstock in an automatic screw machine and said necks being strong enough to support the endmost blank while undergoing the work of such machine, said blanks being of the form of truncated cones with ribs at both ends thereof and having the grain of the metal extending substantially in axial planes and parallel with the conical surface.

4. A rolled article of manufacture consisting of a series of like blanks and necks spacing them apart but integrally connecting same in the form of an elongated rod of size and length suitable for workstock in an automatic screw machine and said necks being strong enough to support the endmost blank while undergoing the work of such machine, said blanks being of circular section throughout their length and having a raceway portion and a rib at each end thereof and having the grain of the metal extending substantially in axial planes and parallel with the surface of the raceway portion.

5. A rolled article of manufacture consisting of a series of identical non-spherical blanks of circular section alternating with neck portions of circular section which space said blanks apart but connect them integrally together in the form of an elongated tube of size and length suitable for workstock in an automatic screw machine and said necks being strong enough to support the endmost blank while undergoing the work of such machine, said article having a continuous bore extending axially through it.

6. The method of making bearing race rings, which consists in rolling into a bar a series of similar recurring ribs and grooves, machining race rings in succession from the end of the formed bar, and utilizing the ribs to control the repeated advance of the bar for such machining; substantially as described.

7. The method of making bearing race rings, which consists in forming on a bar a series of recurring and equally spaced ribs and grooves, and utilizing the ribs to control the advance of the bar through a chuck for successive machining operations on the end portion of the bar; substantially as described.

PAUL KLAMP.